US005707405A

United States Patent [19]
Caputo et al.

[11] Patent Number: 5,707,405
[45] Date of Patent: Jan. 13, 1998

[54] WATER-REDUCIBLE NIGROSINE DYE COMPOSITIONS

[75] Inventors: Peter A. Caputo, South Orange; Alejandro Zimin, Sr., Wayne, both of N.J.

[73] Assignee: Morton International, Inc., Chicago, Ill.

[21] Appl. No.: 629,127

[22] Filed: Apr. 8, 1996

[51] Int. Cl.$^6$ .................................................. C09B 67/00
[52] U.S. Cl. .......................... 8/527; 8/574; 8/576; 8/611; 8/938
[58] Field of Search .................. 8/524–528, 938, 8/574, 576, 611

[56] References Cited

U.S. PATENT DOCUMENTS

| | | | |
|---|---|---|---|
| 4,086,054 | 4/1978 | Seibert et al. | 8/527 |
| 5,336,553 | 8/1994 | Tanaka et al. | 428/229 |

*Primary Examiner*—Margaret Einsmann
*Attorney, Agent, or Firm*—Wayne E. Nacker; Gerald K. White

[57] ABSTRACT

A water-reducible composition comprises A) between about 20 and about 50 wt % of a water-insoluble nigrosine, B) between about 25 and about 40 wt % of a solvent having a flashpoint of at least about 141° F. (61° C.) and a boiling point of at least about 280° F. (138° C.), and C) between about 20 and about 40 wt % of a non-ionic surfactant, the weight percentages being based on total weight of A), B), and C).

The composition is prepared by dissolving the nigrosine A) in a $C_1$–$C_3$ alkanol to form an alcohol solution, mixing the alcohol solution with the solvent B) and non-ionic surfactant C, and subsequently stripping the $C_1$–$C_3$ alkanol.

6 Claims, No Drawings

WATER-REDUCIBLE NIGROSINE DYE COMPOSITIONS

The present invention is directed to water-reducible compositions containing water-insoluble nigrosine dyes and to a method of preparing such compositions.

BACKGROUND OF THE INVENTION

Nigrosine dyes are a well-known class of black dyes. The present invention is directed to solvent-soluble dyes that are insoluble in water.

Although there are water-soluble nigrosines, particularly sulfonated nigrosines, the invention is not directed to these nigrosines. Water-soluble nigrosine, when used to dye a material, remain water-soluble and therefore can be washed away.

On the other hand, it would be desirable to have compositions of water-insoluble nigrosine dyes that are nevertheless reducible in water or aqueous solutions. Such water-reducible nigrosine-containing compositions would be useful, for example, as inks for writing instruments, inks for stamp pads, printing inks, leather finishing, and colorant for rust inhibitors. Heretofore, solutions containing water-insoluble nigrosines have typically utilized organic solvent, such as an alcohol, as the carrier. Even then, solutions of nigrosines may be unstable, and fatty acids are commonly used as stabilizers for nigrosine-in-solvent solutions.

In providing a water-reducible liquid nigrosine-containing solution, it is desirable that the nigrosine concentration be high so that the nigrosine provides a meaningful level of color even when reduced with substantial amounts of water. Nigrosine concentrations of 20% by weight or greater are preferred. Furthermore, for safety reasons, it is preferred that the carrier be non-flammable, i.e., have a flashpoint of at least about 141° F. (61° C.). Furthermore, it is desirable that VOC's be kept low both for environmental reasons and to minimize odor. Accordingly, it is desirable that the boiling point of the organic solvent be at least about 280° F. (138° C.).

SUMMARY OF THE INVENTION

In accordance with the invention, there is provided a water-reducible composition comprising A) between about 20 and about 50 wt % of a water-insoluble nigrosine, B) between about 25 and about 40 wt % of a solvent having a flashpoint of at least about 141° F. (61° C.) and a boiling point of at least about 280° F. (138° C.), and C) between about 20 and about 40 wt % of a non-ionic surfactant, the weight percentages being based on total weight of A), B), and C).

Further in accordance with the invention, there is provided a method for preparing a water reducible composition comprising A) between about 20 and about 50 wt % of a water-insoluble nigrosine, B) between about 25 and about 40 wt % of an organic solvent having a flashpoint of at least about 141° F. (61° C.) and a boiling point of at least about 280° F. (138° C.), and C) between about 20 and about 40 wt % of a non-ionic surfactant, the weight percentages being based on total weight of A), B), and C). In accordance with the method, nigrosine is initially dissolved in a $C_1$–$C_3$ alkanol to provide an alcohol solution. The alcohol solution is mixed with the organic solvent B) and the non-ionic surfactant C). Subsequently, the $C_1$–$C_3$ alkanol is stripped.

DETAILED DESCRIPTION OF CERTAIN PREFERRED EMBODIMENTS

Herein, unless otherwise noted, all percentages are by weight, the weight of the nigrosine A), organic solvent B) and non-ionic surfactant C) being calculated relative to the total amounts of A), B) and C). Weight percentages of other additives are calculated relative to the total of A), B) and C).

By water-insoluble nigrosine it is meant herein a nigrosine having a solubility in water at 25° C. less than about 0.1 g/100 ml.

Nigrosine dyes are obtained by heating nitro compounds, such as nitrobenzene or nitrophenols, with aniline and aniline hydrochloride in the presence of iron or ferric chloride. Different grades (types) of nigrosine can readily be prepared by altering the proportions of reactants and time of heating. The nigrosine compositions thus prepared are cocktails of compounds which, in its simplest form can be shown as:

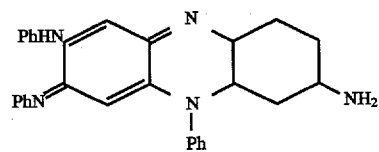

This can be said about C.I. Solvent Black 5 and the free base of C.I. Solvent Black 7 hydrochloride structure shown below:

Black 5:

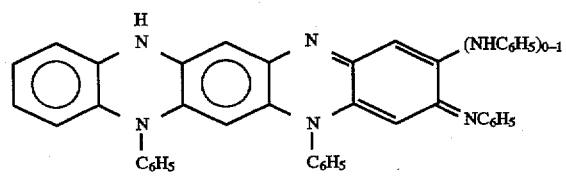

Black 7 Spirit Soluable:

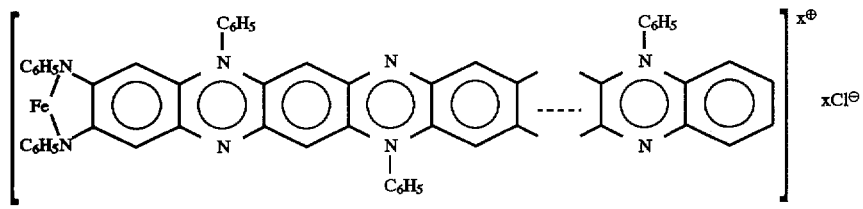

Nigrosine base is prepared by reaction of nigrosine compositions with mild alkalis, resulting in rearrangement.

Organic solvents B) useful in the present invention include, but are not limited to: diethyleneglycol, triethylene glycol, tetraethylene glycol, propylene glycol, n-methyl-2-pyrrolidone, and mixtures thereof.

Suitable non-ionic surfactants include fatty acid esters, polyoxyethylated nonyl phenol derivatives; Rhone Poulenc—CO-720 and CO-630 nonylphenoxypoly (ethyleneoxy)ethanol CAS #9016-45-9; Union Carbide—Tergitol D-683 alkoxylated alkylphenol CAS #37251-69-7; Rhone Poulenc—Alkamide 2106 modified coconut diethanolamide CAS #68603-42-9; Rhone Poulenc—Alkamuls EL-985 polyethoxylated caster oil CAS #75-21-8; and Morton International—Soltex N long chain fatty acid esters, CAS# N.E. Water-insoluble nigrosines do not dissolve directly in the high-flashpoint, high-boiling solvents B), described above, to the high concentrations described and claimed herein. Accordingly, in accordance with the present invention, the nigrosine is first dissolved in the $C_1$–$C_3$ alkanol, preferably n-propanol to provide an alcohol solution. The concentration of nigrosine in the alcohol solution is preferably high, e.g., preferably at least about 20 wt %, so as to assure proper pre-dissolving of the nigrosine and to minimize the amount of alkanol which is to be stripped at a later stage. While nigrosines dissolve in low molecular weight alkanols, alkanols are undesirable from the standpoint of VOCs and flammability. Also, to reduce the waste stream generated by this process, the alkanol can be isolated and re-used for subsequent production batches of this invention.

The nigrosine-in-alkanol solution is then added to the high-flashpoint, high-boiling organic solvent B) and the non-ionic surfactant C). Preferably, addition is to the solvent B) first, then the surfactant C); although, addition to a mixture of solvent B) and surfactant C) is possible. Addition of the nigrosine-in-alkanol solution to B) and C), either successively or as a mixture of B) and C), is done slowly with agitation to prevent precipitation of the nigrosine. Likewise, components B) and C) can be added together (as a premix) or separately, directly to the nigrosine-in-alkanol solution.

To reduce flashpoint and solubility, the alkanol is then stripped at elevated temperatures and/or reduced pressure. While the compositions of the present invention utilize a high-flashpoint, high-boiling solvent, a user of these solutions who has less concern for either flashpoint or VOCs, perhaps because of the particular use environment or low level of use, may add a compatible solvent, such as methyl lactate, with a lower flashpoint and/or boiling point.

The nigrosine-containing compositions of the present invention are infinitely dispersible in water or aqueous solutions. When added to water or aqueous solutions with agitation, the compositions of the present invention are dispersed as an oil-in-water emulsion.

The invention will now be described in greater detail by way of specific example:

EXAMPLE 1

20 gm of C.I. Solvent Black 7 are dissolved in 80 gm of n-propanol. To this solution is added, with stirring, 30 gm. of diethylenel glycol. Subsequently, with continued stirring, 25 gm of nonylphenoxypoly(ethyleneoxy)ethanol (Rhone Polenc) is added. The n-propanol is subsequently stripped at 110° C.

The composition was mixed at a 1:3 volume ratio with water. A stable dispersion of the composition in water was formed.

EXAMPLE 2

Example 1 was repeated, except substituting Solvent Black 5 for Solvent Black 7.

What is claimed is:

1. A water-reducible composition consisting essentially of A) between about 20 and about 50 wt % of a water-insoluble nigrosine, B) between about 25 and about 40 wt % of a glycol or pyrrolidone solvent having a flashpoint of at least about 141° F. (61° C.) and a boiling point of at least about 280° F. (138° C.) and C) between about 20 and about 40 wt % of a non-ionic surfactant, the weight percentages being based on total weight of A), B), and C).

2. A method for preparing a water reducible composition consisting essentially of A) between about 20 and about 50 wt % of a water-insoluble nigrosine, B) between about 25 and about 40 wt % of a glycol or pyrrolidone solvent having a flashpoint of at least about 141° F. (61° C.) and a boiling point of at least about 280° F. (138° C.), and C) between about 20 and about 40 wt % of a non-ionic surfactant, the weight percentages being based on total weight of A), B), and C), the method comprising, dissolving said nigrosine A) in a $C_1$–$C_3$ alkanol to form an alcohol solution, mixing said alcohol solution with said solvent B) and said non-ionic surfactant C), and subsequently, stripping said $C_1$–$C_3$ alkanol.

3. The method according to claim 2 wherein said alcohol solution is mixed first with said organic solvent B) and subsequently with said non-ionic surfactant.

4. A water-reducible composition consisting essentially of A) between about 20 and about 50 wt % of a water-insoluble nigrosine, B) between about 25 and about 40 wt % of a solvent selected from the group consisting of diethylene glycol, triethylene glycol, tetraethylene glycol, propylene glycol, n-methyl-2-pyrrolidone, and mixtures thereof, and C) between about 20 and about 40 wt % of a non-ionic surfactant, the weight percentages being based on total weight of A), B), and C).

5. A method for preparing a water reducible composition consisting essentially of A) between about 20 and about 50 wt % of a water-insoluble nigrosine, B) between about 25 and about 40 wt % of an organic solvent selected from the group consisting of diethylene glycol, triethylene glycol, tetraethylene glycol, propylene glycol, n-methyl-2-pyrrolidone, and mixtures thereof, and C) between about 20 and about 40 wt % of a non-ionic surfactant, the weight percentages being based on total weight of A), B), and C), the method comprising, dissolving said nigrosine A) in a $C_1$–$C_3$ alkanol to form an alcohol solution, mixing said alcohol solution with said organic solvent B) and said non-ionic surfactant C), and subsequently, stripping said $C_1$–$C_3$ alkanol.

6. The method according to claim 5 wherein said alcohol solution is mixed first with said organic solvent B and subsequently with said non-ionic surfactant.

* * * * *

UNITED STATES PATENT AND TRADEMARK OFFICE
CERTIFICATE OF CORRECTION

PATENT NO.   :   5,707,405
DATED        :   January 13, 1998
INVENTOR(S)  :   Caputo et al.

It is certified that error appears in the above-indentified patent and that said Letters Patent is hereby corrected as shown below:

*Column 3, lines 26-27, Fill unnecessary space between "Morton" & "International" should be filled by moving line 27 up to line 26.*
*Column 3, line 28, Sentence beginning with "Water-insoluble nigrosines" should begin a new paragraph.*
*Column 6, line 2, the formula should read --$C_1$-$C_3$--.*

Signed and Sealed this

Sixth Day of October, 1998

Attest:

BRUCE LEHMAN

Attesting Officer

Commissioner of Patents and Trademarks